United States Patent [19]
Kannegundla et al.

[11] Patent Number: 5,523,788
[45] Date of Patent: Jun. 4, 1996

[54] IMAGE PROCESSOR WITH INPUT BUFFERING TO MULTIPLE DIGITAL SIGNAL PROCESSORS

[75] Inventors: Ram Kannegundla, Rochester, N.Y.; Lionel J. D'Luna, Irvine, Calif.; Yung-Rai Lee, Pittsford, N.Y.

[73] Assignee: Eastman Kodak Company, Rochester, N.Y.

[21] Appl. No.: 313,632
[22] Filed: Sep. 27, 1994
[51] Int. Cl.$^6$ .................................................. H04N 5/335
[52] U.S. Cl. ........................ 348/321; 348/222; 348/311; 348/323
[58] Field of Search ..................... 348/218, 294, 348/302, 303, 311, 315, 316, 317, 319, 320, 321, 322, 323, 324, 222, 223, 228; H04N 5/335

[56] References Cited

U.S. PATENT DOCUMENTS

| | | | |
|---|---|---|---|
| 4,890,165 | 12/1989 | Hasegawa | 358/213.26 |
| 5,077,810 | 12/1991 | D'Luna | 382/41 |
| 5,113,242 | 5/1992 | Tsinberg et al. | 358/12 |
| 5,126,844 | 6/1992 | Basile et al. | 358/141 |
| 5,175,631 | 12/1992 | Juri et al. | 358/335 |
| 5,191,417 | 3/1993 | Skinner et al. | 358/141 |
| 5,210,614 | 5/1993 | Kannegundla et al. | 358/213.28 |
| 5,291,294 | 3/1994 | Hirota | 348/316 |
| 5,412,422 | 5/1995 | Yamada et al. | 348/218 |

FOREIGN PATENT DOCUMENTS

506019A1  9/1992  European Pat. Off. ......... H04N 3/12

Primary Examiner—Wendy Greening
Assistant Examiner—Ngoc-Yen Vu
Attorney, Agent, or Firm—James D. Leimbach

[57] ABSTRACT

A system architecture is provided that includes an image sensor unit operable in a single channel mode and a dual channel mode. The image sensor unit includes an electronic image sensor comprising a row and column array of pixel elements, wherein the rows of the array having a line length of N pixels. First and second digital signal processing units for processing image data generated by the image sensor unit into color component image data are provided, wherein each of said first and second digital signal processing units has a line length processing capacity less than N pixels. An input buffer, coupled between outputs of the image sensor unit and inputs to the digital signal processing units, simultaneously receives two lines of image data from the image sensor unit in the dual channel mode of operation, and sequentially supplies a first portion of each of the simultaneously received image lines to the first digital signal processing unit and a second portion of each of the simultaneously received image lines to the second digital signal processing unit. An output buffer, coupled to the output of the first and second digital signal processing units, combines the color component image data generated by the first and second digital signal processing units into color component image lines of length N pixels. A control unit controls the operation of the image sensor unit, the input buffer, the first and second digital signal processing units, and the output buffer. A frame store receives and stores the color component image lines generated by the output buffer, and a monitor displays the image lines at a frame rate that is about twice the operating frame rate of the image sensor unit.

11 Claims, 7 Drawing Sheets

IMAGE PROCESSOR WITH INPUT BUFFERING TO MULTIPLE DIGITAL SIGNAL PROCESSORS

FIELD OF THE INVENTION

The invention relates in general to a signal processing system architecture for a color imaging system. More specifically, the invention relates to a signal processing system architecture that achieves high definition, motion or still, real-time full color image capture and display.

BACKGROUND

Conventional motion and still electronic imaging systems have been utilized to provide real-time image capture and display. The conventional systems have generally produced standard video resolution analog processed images, for example having 484 lines of image data with each line containing 768 image pixels or less, using image sensors incorporating a single output channel. More recently, higher resolution image sensors have been developed that produce images having over 1000 image lines in which each line contains over 1000 image pixels. The use of the higher resolution image sensors is of particular interest in medical and scientific applications, where it may be desirable to capture still frames for detailed analysis from real-time full motion video. Full motion video, however, generally requires the capture of at least thirty image frames per second. In order to keep the read out rates of high resolution image sensor reasonable (about 20 MHz), it is desirable to utilize image sensors with dual channel outputs. A substantial amount of time, effort and expense could be saved if the digital processing circuits utilized to process the image data from single channel low resolution sensors utilized in conventional systems could be adapted to handle the higher output data rates of the dual channel high resolution image sensors.

Accordingly, it is an object of the invention to provide a system architecture that utilizes digital signal processing circuitry designed to operate with single channel low resolution sensors to process the output data from high resolution dual channel image sensors.

SUMMARY OF THE INVENTION

The invention provides a system architecture that achieves high-definition, motion or still, real-time full color image capture and display. A dual channel high resolution image sensor is utilized to achieve high frame rates. The system architecture first partitions the raw image data generated by the image sensor into vertical strips. The two channel output for a vertical strip is then re-ordered into a sequential output so that digital single processing circuits designed for single channel low resolution sensors can be used to perform color recovery. The vertical strips for each color plane are then merged back into a single high-resolution image, which can be displayed on a monitor or to a computer through a computer interface for archive storage or analysis.

More specifically, a system architecture is provided that includes an image sensor unit operable in a single channel mode and a dual channel mode. The image sensor unit includes an electronic image sensor comprising a row and column array of pixel elements, wherein the rows of the array having a line length of N. First and second digital signal processing units for processing image data generated by the image sensor unit into color component image data are provided, wherein each of said first and second digital signal processing units has a line length processing capacity that is less than N. An input buffer, coupled between outputs of the image sensor unit and inputs to the digital signal processing units, simultaneously receives two lines of image data from the image sensor unit in the dual channel mode of operation, and sequentially supplies a first portion of each of the simultaneously received image lines to the first digital signal processing unit and a second portion of each of the simultaneously received image lines to the second digital signal processing unit. An output buffer, coupled to the output of the first and second digital signal processing units, combines the color component image data generated by the first and second digital signal processing units into color component image lines of length N. A control unit controls the operation of the image sensor unit, the input buffer, the first and second digital signal processing units, and the output buffer. A frame store receives and stores the color component image lines generated by the output buffer, and a monitor displays the image lines at a frame rate that is about twice the operating frame rate of the image sensor unit.

In a single channel mode of operation, the input buffer sequentially receives one line of image data from the image sensor unit and supplies a first portion of each sequentially received image line to the first digital signal processing unit and a second portion of each sequentially received image line to the second digital signal processing unit.

BRIEF DESCRIPTION OF THE DRAWINGS

The invention will be described in detail with reference to the drawings, wherein.

DETAILED DESCRIPTION OF THE PREFERRED EMBODIMENTS

Figure 1:
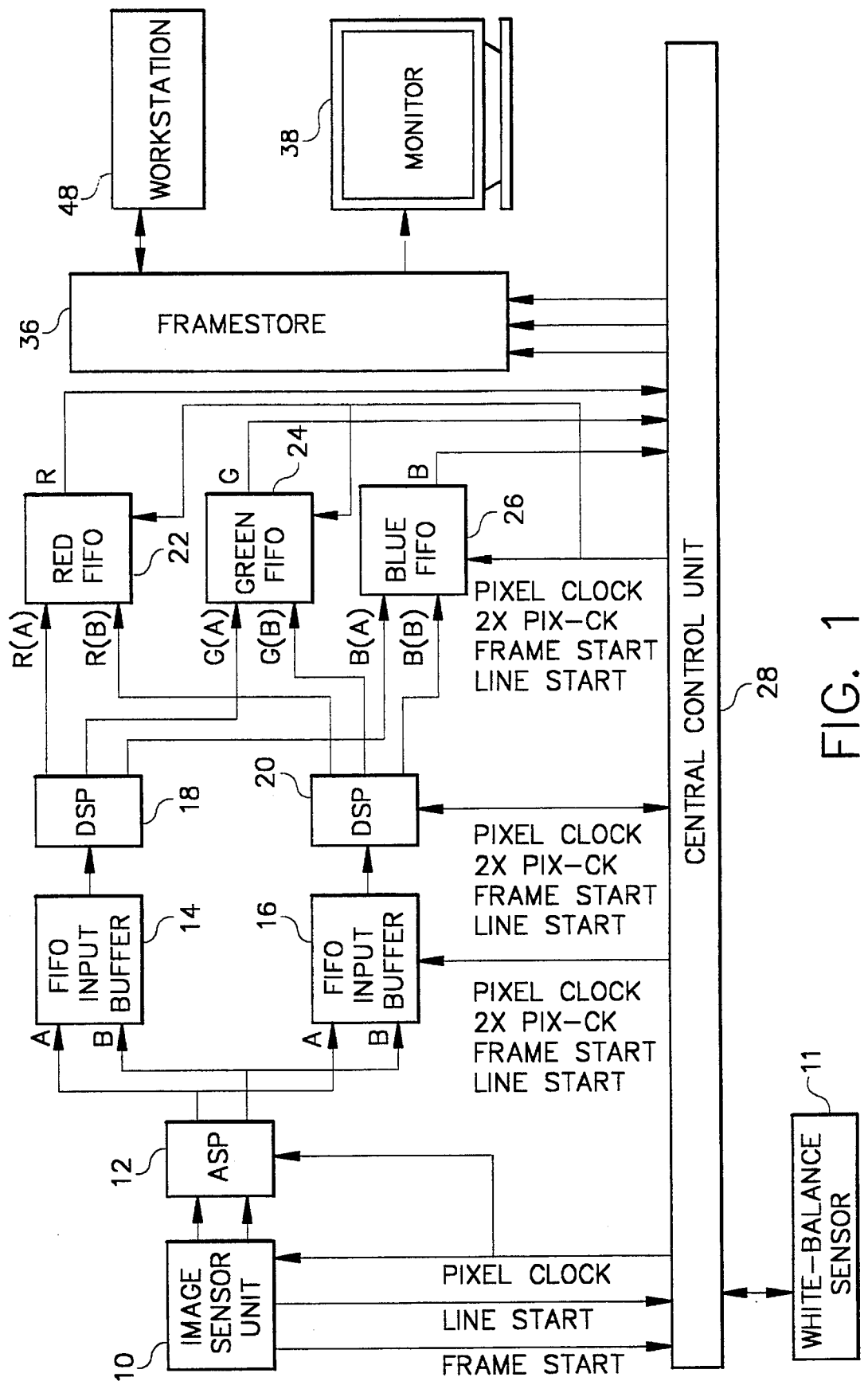
FIG. 1 is a schematic block diagram of an image signal processing system architecture in accordance with the invention.

An image signal processing system architecture in accordance with the invention is illustrated in FIG. 1. The system includes a dual channel electronic image sensor unit 10, an analog signal processing (ASP) unit 12 having dual inputs coupled to dual output channels of the electronic image sensor unit 10, a set of first-in-first-out (FIFO) input buffer units 14–16, each connected to dual output channels of the ASP unit 12, a pair of digital signal processing (DSP) units 18–20, respectively coupled to the outputs of the FIFO input buffer units 14–16, and Red, Green and Blue FIFO output buffer units 22–26, each coupled to the outputs of the DSP units 18–20. A central control unit 28 is provided to control the overall operation of the system and includes, for example, timing circuitry, a microprocessor controller and interface circuitry. A white-balance sensor 11, including red, green and blue photodiodes, may also be employed to provide information about the scene illuminant to the central control unit 28, which subsequently supplies correction values to the DSP units 18–20.

Figure 2:
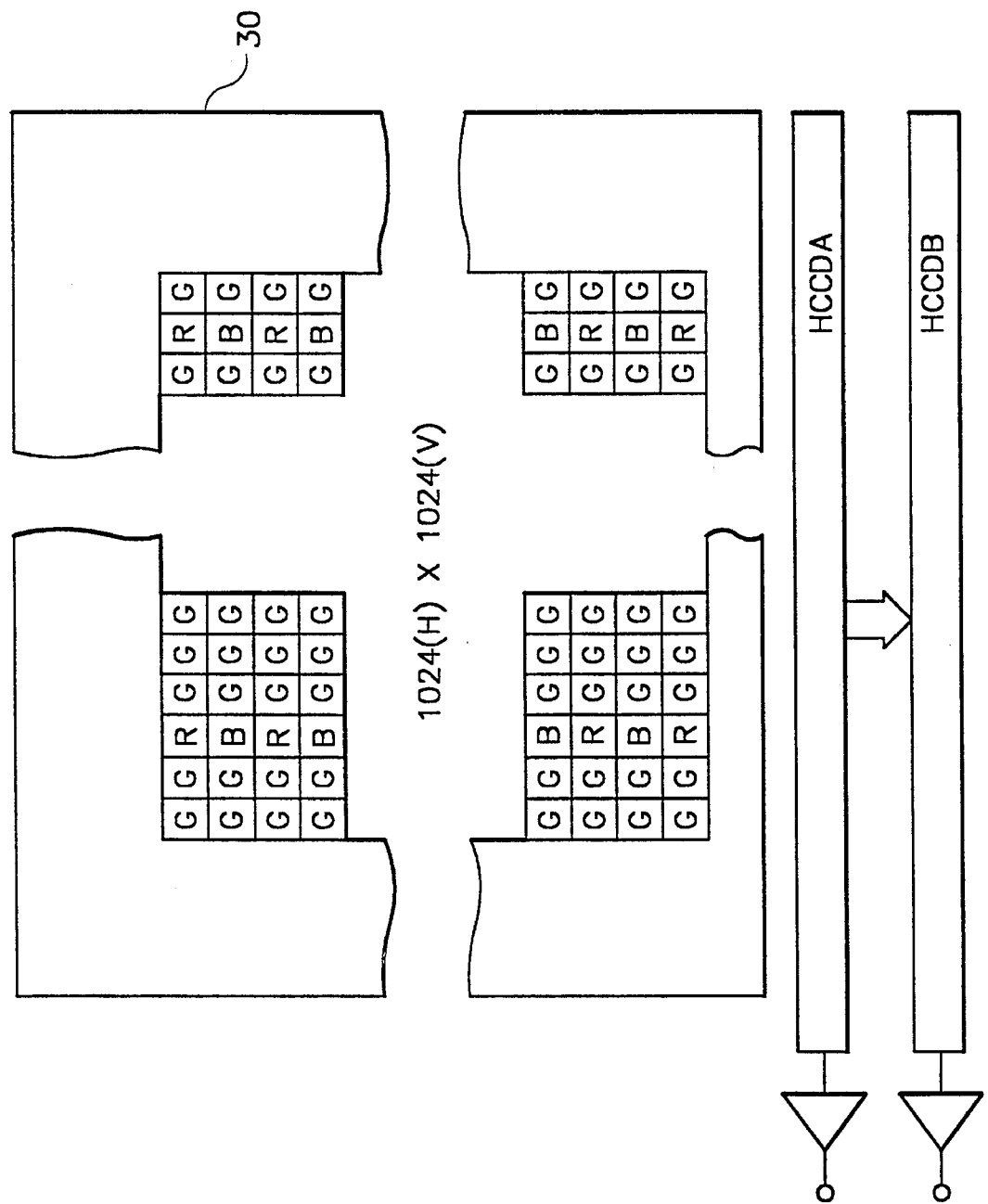
FIG. 2 is a schematic diagram of an image sensor incorporated in the image sensor unit.

The electronic image sensor unit 10 preferably includes a high resolution dual-channel image sensor 30, shown in FIG. 2, having an analog output rate of between 12–30 frames per second and a blur filter (not shown) to prevent aliasing. The frame rate of the image sensor 30 is dependent on a pixel clock signal supplied by the central control unit 28. The image sensor 28 includes a 1024×1024 array of pixel elements, arranged in a "3G" pattern with an in-line, line sequential RB pattern and two horizontal CCD transfer registers (HCCDA, HCCDB) that can be operated in either a single or dual channel mode. The pixel elements generate an image signal corresponding to the amount of radiation incident thereon. In the single channel mode, the image signals from each line of the array of pixel elements are sequentially output from a single horizontal transfer register (preferably register HCCDA). In the dual channel mode, the image signals from two lines are simultaneously output from both horizontal transfer registers HCCDA and HCCDB. Vertical and horizontal clocking signals are generated and supplied to the image sensor 30 by timing circuitry provided within the electronic image sensor unit 10 in a conventional manner.

The ASP unit 12 includes a single/dual channel analog-to-digital (A/D) converter (not shown) capable of operating at the horizontal register clock rate of the image sensor unit 10. The ASP unit 12 provides different gains for the R, G, B signals generated by the image sensor unit 10 to maximize the dynamic range independent of spectral sensitivity prior to processing by the A/D converter. The output from the ASP unit 12 is either a single channel or two channels of digitized image data depending on the operating mode being utilized by the system.

Figure 3:
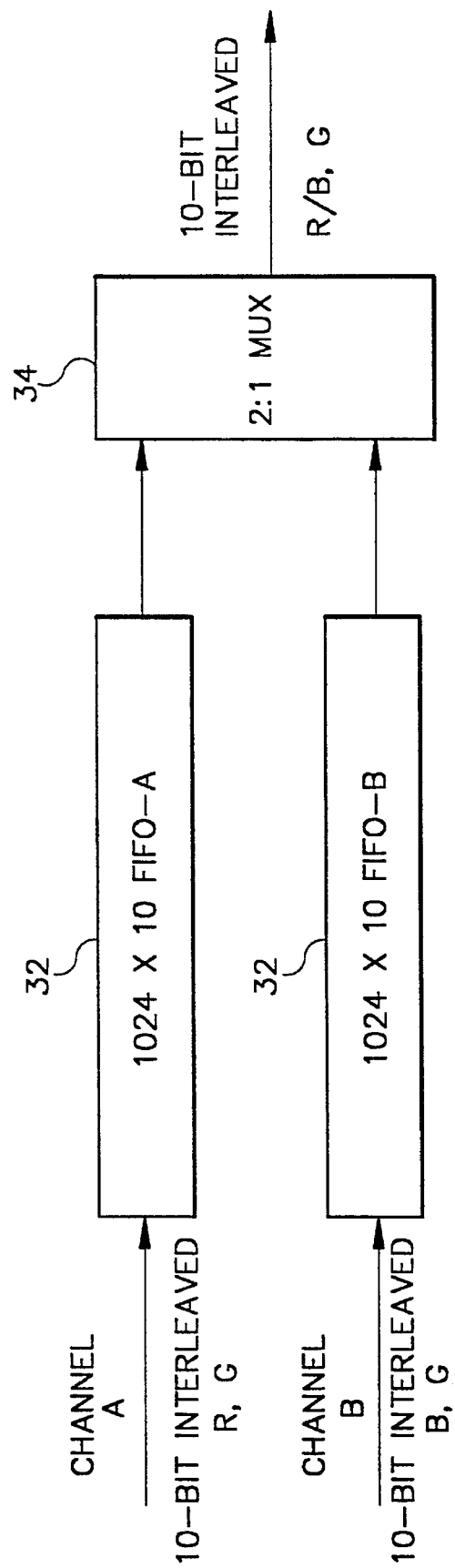
FIG. 3 is a schematic block diagram of the input buffer units illustrated in FIG. 1.
Figure 4:
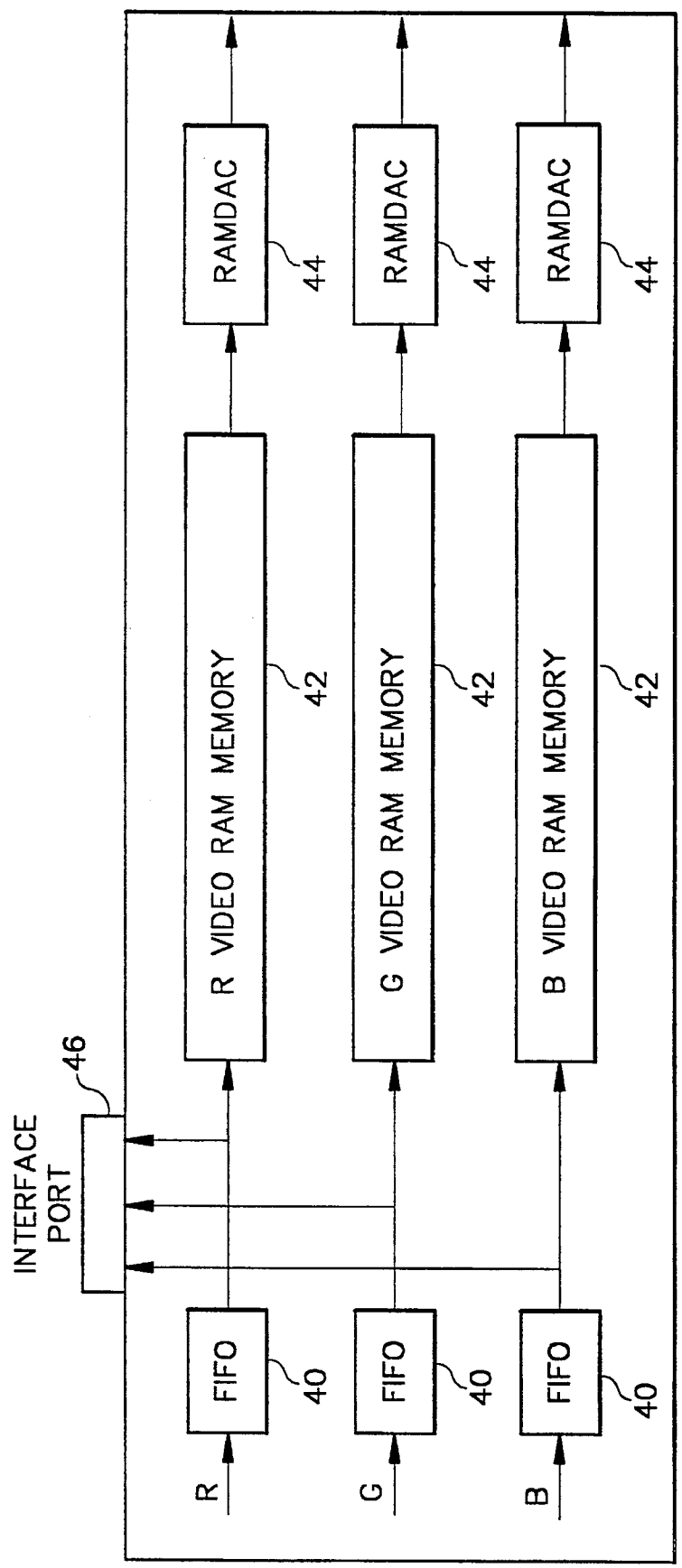
FIG. 4 is a schematic block diagram of the frame store illustrated in FIG. 1.

The FIFO input buffer units 14–16 are used to split the image data generated by the image sensor unit 10 and digitized by the ASP unit 12 into vertical strips using a method similar to the vertically stripping described in U.S. Pat. No. 5,077,810, the contents of which are incorporated herein by reference, prior to supplying the digitized image data to the DSP units 18–20 for processing. Each of the input buffer units 14–16 includes two 1024×10 FIFO registers 32, designated as FIFO-A and FIFO-B, coupled to a multiplexer 34 as shown in FIG. 3. In the dual channel mode of operation, each of the FIFO input buffer units 14–16 simultaneously receive half lines of digitized image data in each of the FIFO registers 32 from the two output channels of the ASP unit 12, and sequentially output the half lines to the DSP units 18–20 via the multiplexer 34, at the horizontal clocking rate of the image sensor unit 10, to order the image data in a manner required by the DSP units 18–20 as will be described in greater detail. In a single channel mode of operation, the FIFO input buffer units 14–16 utilize only one of the FIFOs 32, and the data is read out at half the horizontal clocking rate of the image sensor unit 10.

In the illustrated embodiment, two FIFO input buffer units 14–16 are used with two corresponding DSP units 1820. The image data can be split into more than two vertical strips, however, if the line length of the image sensor utilized in the image sensor unit 10 is more than twice the processing capacity of the DSP units 18–20 or the horizontal clocking rate is too high for the DSP units 18–20. In such a case, addition DSP channels would be required to process the digitized image data in the time required to read out one full horizontal line.

The DSP units 18–20 perform full color recovery, i.e. generate three full resolution R, G, B channels of output data, for the vertical strip of the image that is being processed and perform other functions such as white balance, defect correction and/or edge enhancement. The DSP units 18–20 each preferably utilize KDSP-A110 and KDSP-A240 signal processing chips, available from the Eastman Kodak Company of Rochester, N.Y., to process the raw digitized image data at the FIFO input buffer units 14–16 readout rates. While these chips are capable of processing lines lengths (786 pixels/line or less) less than the line length of the high resolution image sensor 28 employed in the image sensor unit 10, the unique characteristics of the system architecture permit the chips, which were designed to function with the lower resolution sensors, to handle the output from the higher resolution sensor as will be described in greater detail.

The Red, Green and Blue FIFO output buffer units 22–26, preferably of the same construction of the FIFO input buffer units 14–16, are used to reconstruct the image after it has been processed by the DSP units 18–20. The FIFO output buffer units 22–26 receive data at the rate processed by the DSP units 18–20, but output the data at a higher rate in the dual channel mode of operation. The processed data must be generated within half the time that it takes to read it out of the image sensor unit 10, as two lines are being read out from the image sensor unit 10 simultaneously, but the output from the overall system is line sequential, i.e., one line at a time.

In order to display an image, a frame store unit 36 (See FIG. 1) is provided that is capable of receiving 24-bit R, G, B data at the frame rate of the image sensor unit 10 (30 frame/sec) and supplying the image data at a rate of about 72 frames/sec to a 1280×1024 monitor 38. The frame store unit 36 includes FIFO input registers 40, for each of the color component channels, that are coupled to video dynamic random access memories (VDRAM) 42. The outputs from the VDRAMs 42 are supplied to digital-to-analog converters (RAMDAC) 44 that convert the digital color component signals to analog signals for display on the monitor 38. The VDRAMs 42 can be written at one frame rate while being read independently on a serial access port at another frame rate.

In a freeze frame mode, writing to the frame store 36 is inhibited and only reading is permitted. The frame store 36 includes an interface port 46 that is coupled to a computer workstation 48, which permits the computer workstation 48 to acquire a frozen frame of image data. A simple handshake is set up with the computer workstation 48 and the required addresses are supplied to the VDRAMs 42. The computer workstation 48 is signaled when the data is enabled onto the interface port 46. A high definition still image can therefore be archived in the computer workstation 48 for future review or analysis.

The operation of the system in both the single channel mode of operation and the dual channel mode of operation will now be described in greater detail with reference to FIGS. 5, 6(*a*) and 6(*b*).

Figure 5:
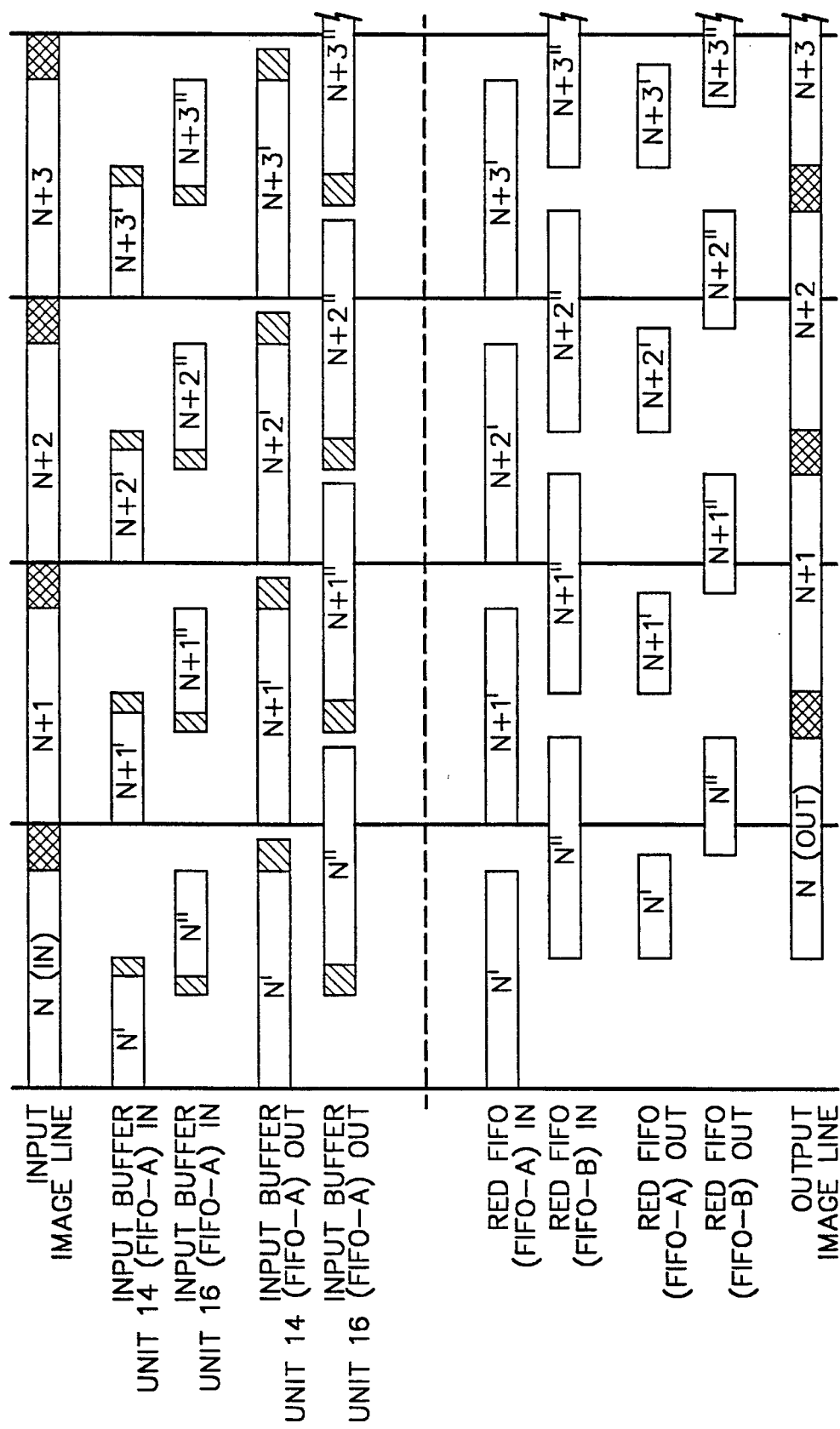
FIG. 5 is a timing diagram of the operation of the system architecture illustrated in FIG. 1 in the single channel mode of operation.

FIG. 5 is a timing diagram of the operation of the system architecture in the single channel mode of operation. For purposes of illustrating the invention, it will be assumed that only the "A" channel output from the image sensor unit 10 is supplied to the DSP unit 12. The ASP unit 12 outputs digitized image data to the A channel input of each of the input buffer units 14–16. The first input buffer unit 14 is clocked to receive at least the first half N' of an input image line N in its FIFO-A register, while the second input buffer unit 16 is clocked to receive the remaining second half N" of input image line N in its FIFO-A register. The outputs of the first and second FIFO input buffer units 14–16 are supplied to the DSP units 18–20 at half the horizontal clocking rate of the image sensor unit 10. The color component data generated by the DSP units 18–20 are then clocked into the Red, Green and Blue output buffer units 22–26. While FIG. 5 only illustrates the timing for the Red output buffer unit 22 to simplify the figure, it will be understood that the Green and Blue output buffer units 24, 26 operate in a similar manner. The color component data is clocked out of the output buffer units 22–26 at the horizontal clocking rate of the image sensor unit 10 to form the composite output image line N (out).

Figure 6A:
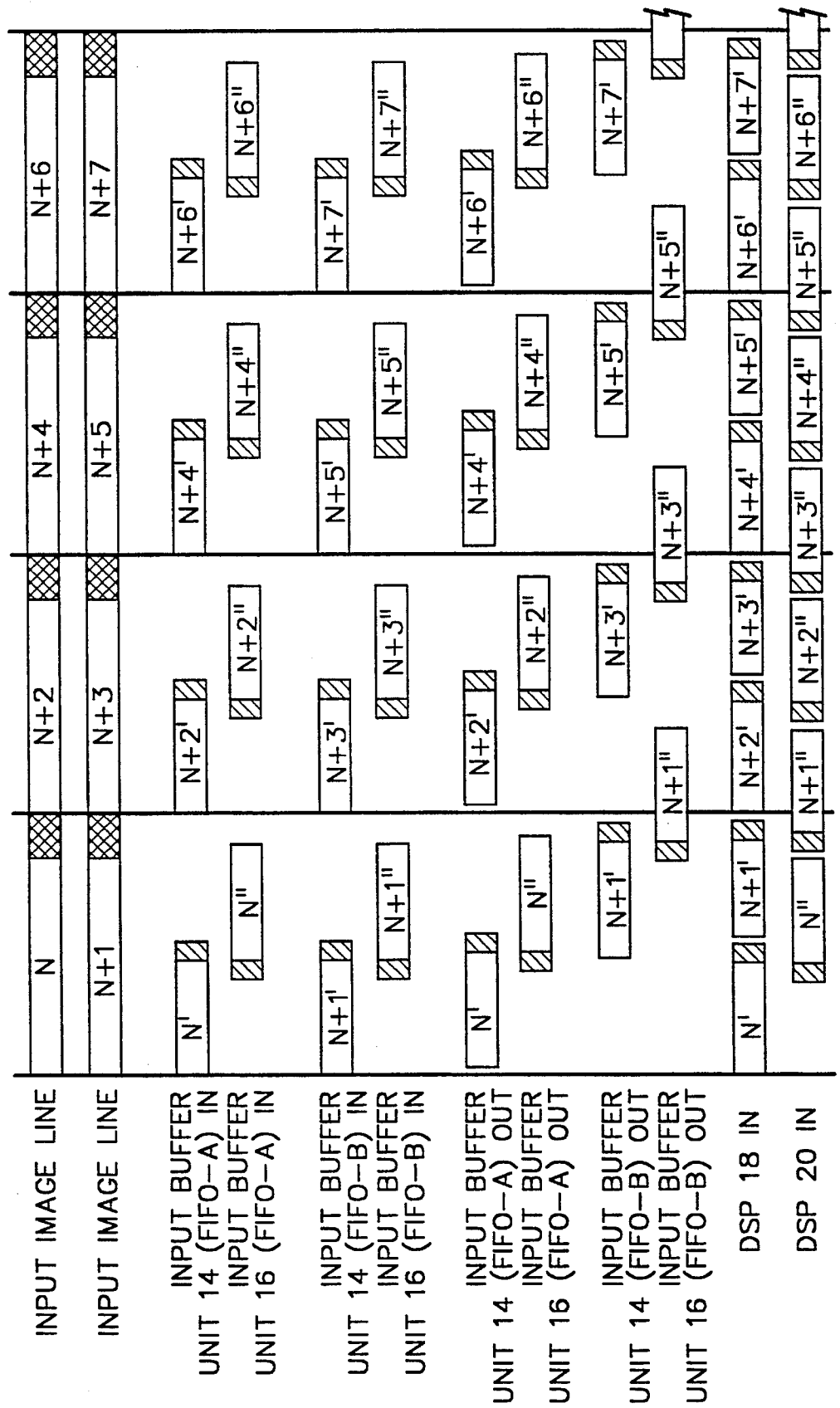
FIGS. 6(a) and 6(b) are a timing diagrams of the operation of the system architecture in the dual channel mode of operation.
Figure 6B:
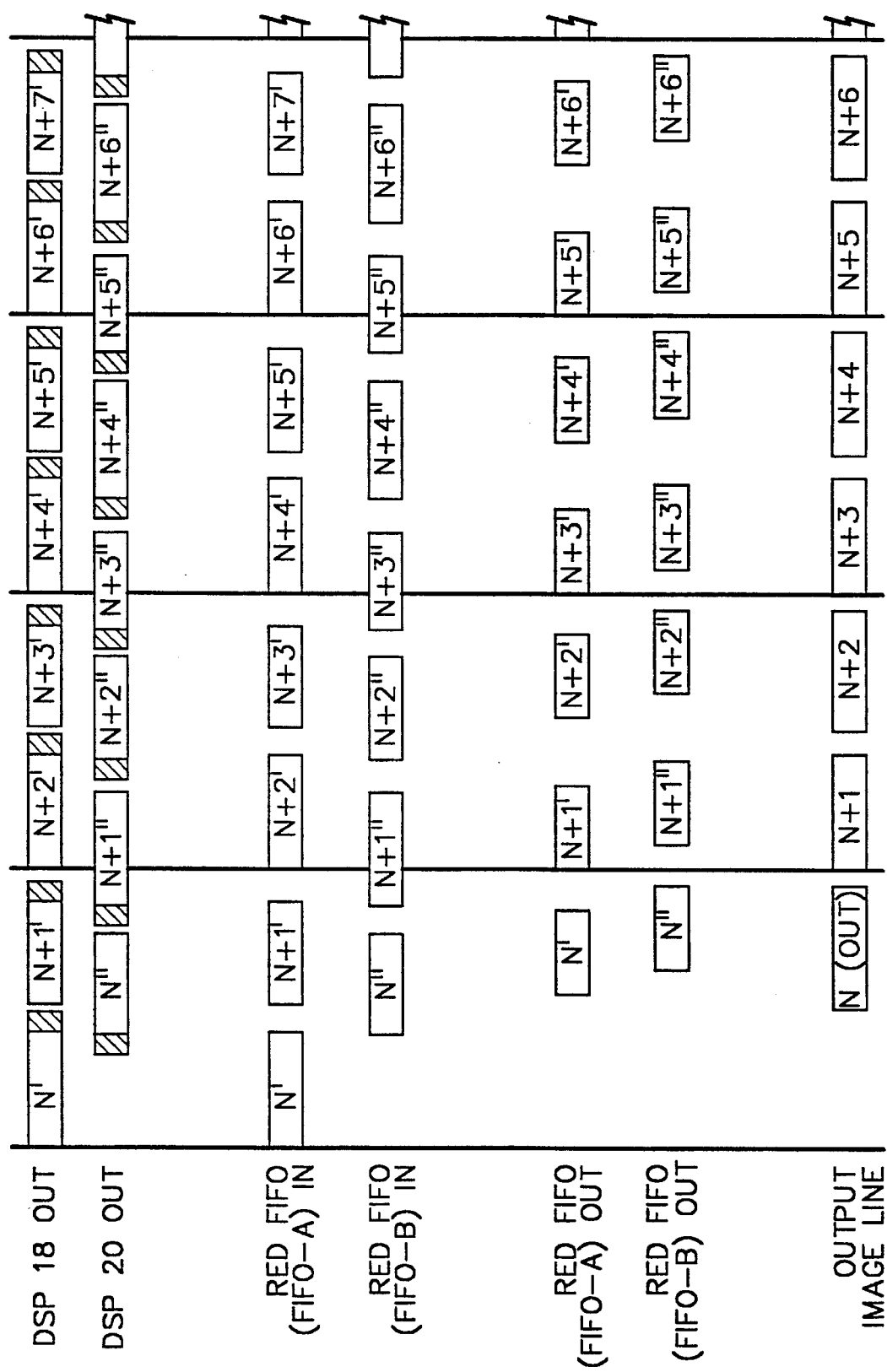

FIGS. 6(*a*) and 6(*b*) are timing diagrams of the operation of the system architecture in the dual channel mode of operation. Two input image lines N and N+1 are simultaneously supplied to the FIFO input buffer units 14–16. At least the first half of the first and second image lines, N' and N+1 are respectively stored in the FIFO-A and FIFO-B registers of the first FIFO input buffer unit 14, while the second half of the first and second image lines, N" and N+1" are respectively stored in the FIFO-A and FIFO-B registers of the second FIFO input buffer unit 16. The first line halfs N' and N+1' are subsequently sequentially read out of the first FIFO input buffer unit 14 and supplied to the DSP unit 18, while the second halfs N" and N+1" are sequentially read out of the second FIFO input buffer unit 16 and supplied to the DSP unit 20 at the horizontal clocking rate of the image sensor unit 10. The outputs from the DSP units 18–20 are then supplied to the Red, Green and Blue FIFO output buffer units 22–26, although only the timing for the Red FIFO output buffer unit 22 is illustrated. The first halfs N' and N+1' are stored in the FIFO-A register of the Red FIFO output buffer unit 22 and the second halfs N" and N+1" are stored in the FIFO-B register. The first and second halfs of a given line, for example N' and N", are then sequentially clocked out to generate an output image line.

It should be noted that, in the illustrated embodiment, the DSP units 18–20 can process lines lengths (768 pixels/line) which are greater than half the line length of the image sensor unit 10 (1024 pixels/line). Thus, some overlap occurs in the portions of the image lines supplied by the input buffer units 14–16 to the DSP units 18–20. The overlap is illustrated in FIGS. 5 and by diagonal stripes. The overlap is not required, however, and the system will operate properly as long as the DSP units 18–20 can process line lengths that are a minimum of half the line length of the image sensor unit 10. If the DSP units 18–20 can only process line lengths that are less than half the line length of the image sensor unit, then an additional channel must be provided as discussed above.

The invention has been described with reference to certain preferred embodiments thereof. It will be understood, however, that modifications and variations are possible within the scope of the appended claims.

Reference Numerals

10 Electronic Image Sensor Unit
11 White Balance Sensor
12 Analog Signal Processing (ASP) Unit
14 First-in-First-Out (FIFO) Input Buffer Unit
16 First-in-First-Out (FIFO) Input Buffer Unit
18 Digital Signal Processing (DSP) Unit
20 Digital Signal Processing (DSP) Unit
22 Red FIFO Output Buffer Unit
24 Blue FIFO Output Buffer Unit
26 Green FIFO Output Buffer Unit
28 Central Control Unit
30 Image Sensor
32 FIFO Register
34 Multiplexer
36 Frame Store
38 Monitor
40 FIFO
42 Video Dynamic Random Access Memory (VDRAM)
44 Digital-to-Analog Converter (RAMDAC)
46 Interface Port
48 Computer Workstation

What is claimed is:

1. An image processing system comprising:

an image sensor unit operable in a dual channel mode, said image sensor unit including an electronic image sensor comprising a row and column array of pixel elements, wherein the rows of the array having a line length of N pixels, the dual channel mode of the image sensor being capable of simultaneously outputting a pair of lines, each of the lines being N pixels long;

first and second digital signal processing units for processing image data generated by the image sensor unit into color component image data, wherein each of said first and second digital signal processing units has a line length processing capacity that is at least one half the line length of N pixels;

input buffer means, for interfacing outputs of the image sensor unit to inputs of the digital signal processing units, the input buffer means having a pair of buffers for simultaneously receiving each of the pair of lines of image data from the image sensor unit, and sequentially supplying a first portion of each of the simultaneously received image lines to said first digital signal processing unit and a second portion of each of the simultaneously received image lines to said second digital signal processing unit;

output buffer means coupled to the output of the first and second digital signal processing units for combining the color component image data generated by the first and second digital signal processing units into color component image lines of length N; and control means for controlling the operation of the image sensor unit, the input buffer means, the first and second digital signal processing units, and the output buffer means.

2. An image processing system as claimed in claim 1, further comprising an analog signal processing unit coupled between outputs of the image sensor unit and inputs to the input buffer means.

3. An image processing system as claimed in claim 1, further comprising a frame store means for receiving and storing the color component image lines generated by the output buffer means.

4. An image processing system as claimed in claim 3, further comprising a monitor coupled to an output of the frame store.

5. An image processing system as claimed in claim 4, wherein the control means controls the operation of the frame store to supply the color component image lines to the monitor at a frame rate that is about twice the operating frame rate of the image sensor unit.

6. An image processing system as claimed in claim 1, wherein the input buffer means comprises first and second FIFO buffer units, wherein each of the FIFO buffer units includes first and second FIFO registers.

7. An image processing system as claimed in claim 1, wherein, the image sensor has a single channel mode in addition to the dual channel mode, means for selecting between the single and dual channels, and means for operating within the single channel mode such that the input buffer means sequentially receives one line of image data at a time from the image sensor unit in the single channel mode of operation, and supplies a first portion of each sequentially received image line to said first digital signal processing unit and a second portion of each sequentially received image line to said second digital signal processing unit.

8. An image processing system as claimed in claim 3, further comprising a computer workstation coupled to the frame store via an interface port.

9. An image processing system comprising:

an image sensor unit operable in a dual channel mode, said image sensor unit including an electronic image sensor comprising a row and column array of pixel elements, wherein the rows of the array having a line length of N pixels, the dual channel mode of the image sensor being capable of simultaneously outputting a pair of lines, each of the lines being N pixels long;

first and second digital signal processing units for processing image data generated by the image sensor unit into color component image data, wherein each of said first and second digital signal processing units has a line length processing capacity that is at least one half the line length of N pixels;

input buffer means, coupled between outputs of the image sensor unit and inputs to the digital signal processing units, for supplying image data generated by the image sensor unit to the digital signal processing units, the input buffer means having a pair of buffers for simultaneously receiving each of the pair of lines of image data from the image sensor unit and wherein the pair of buffers further comprises first and second FIFO buffer units, wherein each of the FIFO buffer units includes first and second FIFO registers;

output buffer means coupled to the output of the first and second digital signal processing units for combining the color component image data generated by the first and second digital signal processing units into color component image lines of length N pixels; and control means for controlling the operation of the image sensor unit, the input buffer means, the first and second digital signal processing units, and the output buffer means.

10. An image processing system as claimed in claim 9, wherein the input buffer means simultaneously receives two lines of image data from the image sensor unit in the dual channel mode of operation, and sequentially supplies a first portion of each of the simultaneously received image lines to said first digital signal processing unit and a second portion of each of the simultaneously received image lines to said second digital signal processing unit.

11. An image processing system as claimed in claim 10, wherein the image sensor has a single channel mode that has been activated and the input buffer means sequentially receives one line of image data at a time from the image sensor unit in the single channel mode of operation, and supplies a first portion of each sequentially received image line to said first digital signal processing unit and a second portion of each sequentially received image line to said second digital signal processing unit.

* * * * *